United States Patent
Chen et al.

(10) Patent No.: US 11,531,569 B2
(45) Date of Patent: Dec. 20, 2022

(54) SYSTEM AND METHOD FOR SCALING PROVISIONED RESOURCES

(71) Applicant: Core Scientific, Inc., Bellevue, WA (US)

(72) Inventors: Albert Hse-Lin Chen, Redmond, WA (US); Max Alt, San Francisco, CA (US); Jesse Barnes, Sebastopol, CA (US)

(73) Assignee: Core Scientific Operating Company, Bellevue, WA (US)

( * ) Notice: Subject to any disclaimer, the term of this patent is extended or adjusted under 35 U.S.C. 154(b) by 19 days.

(21) Appl. No.: 16/185,762

(22) Filed: Nov. 9, 2018

(65) Prior Publication Data

US 2019/0272200 A1 Sep. 5, 2019

Related U.S. Application Data

(60) Provisional application No. 62/584,667, filed on Nov. 10, 2017.

(51) Int. Cl.
*G06F 9/46* (2006.01)
*G06F 9/50* (2006.01)
*G06F 9/48* (2006.01)

(52) U.S. Cl.
CPC .......... *G06F 9/5027* (2013.01); *G06F 9/4881* (2013.01); *G06F 9/50* (2013.01)

(58) Field of Classification Search
CPC .................................................. G06F 9/5027
(Continued)

(56) References Cited

U.S. PATENT DOCUMENTS

| 6,766,348 | B1 * | 7/2004 | Combs | G06F 9/5083 |
| | | | | 709/228 |
| 7,802,256 | B2 * | 9/2010 | Havens | G06F 9/4887 |
| | | | | 718/100 |

(Continued)

FOREIGN PATENT DOCUMENTS

| JP | 2003-263401 A | 9/2003 |
| KR | 10-2010-0091853 A | 8/2010 |

(Continued)

OTHER PUBLICATIONS

WO, International Search Report and Written Opinion, Application No. PCT/US2018/060099, dated Mar. 26, 2019.

*Primary Examiner* — Evral E Bodden
(74) *Attorney, Agent, or Firm* — Fishman Stewart PLLC

(57) ABSTRACT

Systems and apparatuses for provisioning computer services or resources and methods for making and using the same. In one embodiment, an exemplary method for performing an iterative search can include selecting a service from a group of available services for adjustment. An application associated with the selected service can be run, and an amount of resources consumed while the application is run can be captured. A provision level for the selected service, a provision type for the selected service or both can be adjusted based upon the captured amount of resources consumed. The method then can determine whether provision levels of the available services, provision types of the available services or both require further adjustment to be most performant. The approaches described herein advantageously can be applied, for example, to "right-size" or "scale" multiple resources.

20 Claims, 5 Drawing Sheets

(58) Field of Classification Search
USPC .......................................................... 718/104
See application file for complete search history.

(56) References Cited

U.S. PATENT DOCUMENTS

| | | | |
|---|---|---|---|
| 8,286,177 B2* | 10/2012 | Hollingsworth | G06F 11/3419 |
| | | | 718/104 |
| 9,009,318 B2* | 4/2015 | Rangarajan | G06F 9/5011 |
| | | | 709/226 |
| 9,083,743 B1* | 7/2015 | Patel | H04L 67/32 |
| 9,626,710 B1* | 4/2017 | Chheda | G06Q 30/0631 |
| 10,585,797 B2* | 3/2020 | Friedmann | G06F 12/0811 |
| 10,884,778 B1* | 1/2021 | Dunagan | G06F 9/45558 |
| 11,009,836 B2* | 5/2021 | Hoffmann | G06N 7/005 |
| 2005/0234935 A1* | 10/2005 | Barsness | H04L 47/70 |
| 2010/0146512 A1* | 6/2010 | Chen | G06F 13/362 |
| | | | 718/103 |
| 2012/0047265 A1* | 2/2012 | Agarwala | G06F 3/0665 |
| | | | 709/226 |
| 2014/0089917 A1 | 3/2014 | Attalla et al. | |
| 2014/0130055 A1* | 5/2014 | Guha | G06F 3/0665 |
| | | | 718/104 |
| 2017/0255497 A1 | 9/2017 | Reshadi et al. | |

FOREIGN PATENT DOCUMENTS

| | | |
|---|---|---|
| KR | 10-2013-0127445 A | 11/2013 |
| KR | 10-2016-0132439 A | 11/2016 |

\* cited by examiner

SYSTEM AND METHOD FOR SCALING PROVISIONED RESOURCES

CROSS-REFERENCE TO RELATED APPLICATIONS

This application claims the benefit of, and priority to, U.S. Provisional Application Ser. No. 62/584,667, filed Nov. 10, 2017, the disclosure of which is hereby incorporated herein by reference in its entirety and for all purposes.

FIELD

This specification relates generally to systems, apparatuses and methods for provisioning compute, storage and/or other services or resources based on application requirements, historical performance, system metrics and/or other factors to provide cost-performance effective services. The embodiments disclosed herein are not intended to be exhaustive of the contemplated configurations and processes.

BACKGROUND

Provisioning resources generally involves naïve "right-sizing" approaches, such as manual trial and error (e.g. looking at historical usage patterns), first-fit, or cheapest fit. Such approaches are generally manually intensive and do not easily translate across different service providers (e.g. Amazon Web Services (AWS), on-premises and Google Compute Engine (GCE)). These approaches also do not improve (e.g. learn) at predictions over time as would be desirable. For example, manual trial and error though works across service providers is difficult to scale and is error prone. Similarly, first/cheapest fit is easier to implement but does not provide optimal or user-defined cost-performance tradeoffs.

In light of the foregoing and other problems associated with prior approaches, there exists a need for improved provisioning systems, apparatuses and methods.

SUMMARY

This specification describes new technologies relating to systems, apparatuses and methods for providing users with enhanced or optimal, cost-performance-effective compute, storage and other services, for example, by analyzing performance and/or system metrics. The approaches described and contemplated herein can be applied, for example, to "right-sizing" virtual machine (VM) and storage service provisions (e.g. in the cloud and/or on-premises).

Figure 1:
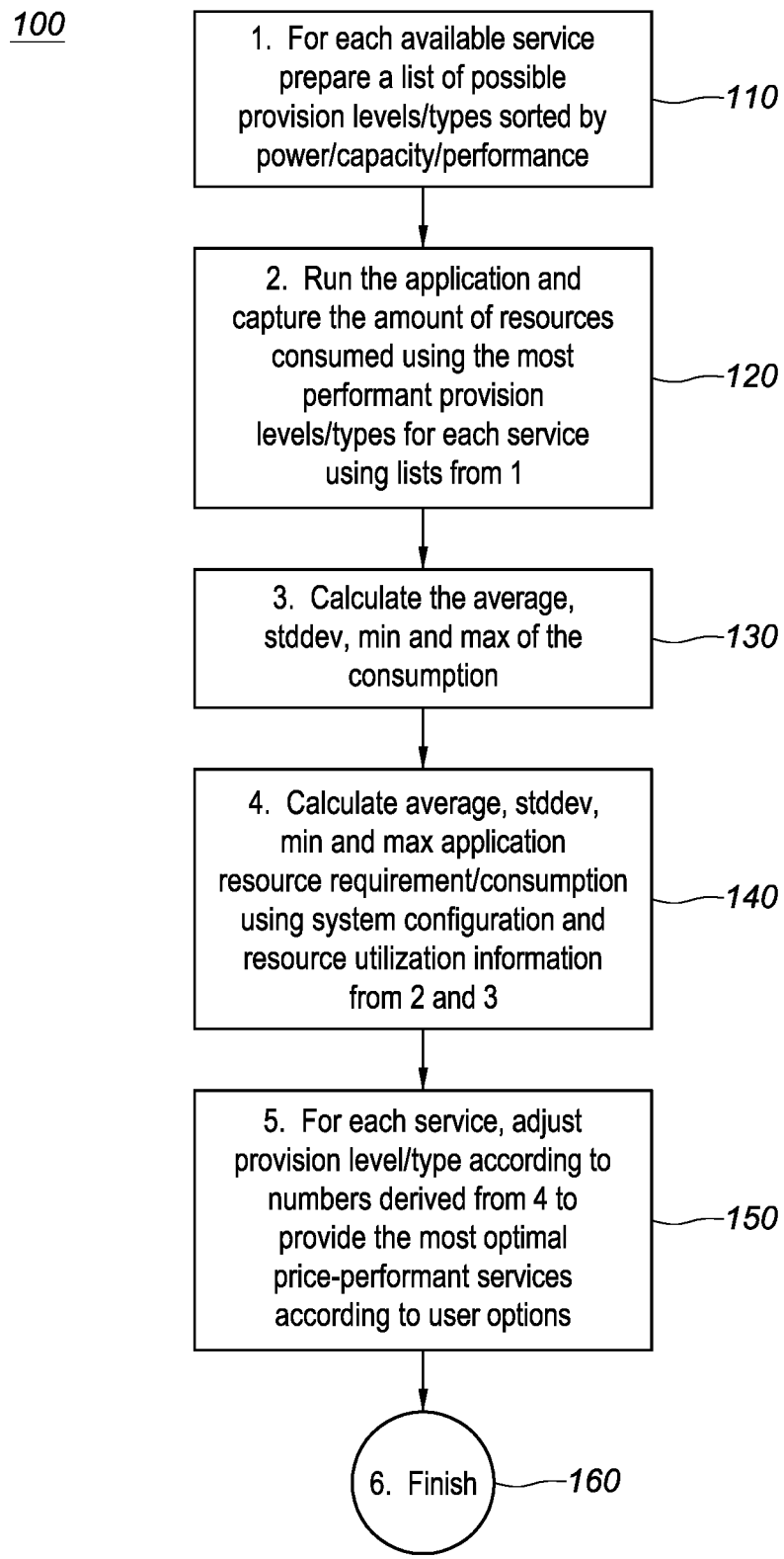
FIG. 1 is an exemplary flow chart for illustrating an embodiment of a predictive model with system information.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Systems, apparatuses and methods for improved provisioning of compute, storage and/or other services or resources are disclosed herein. The described approaches can be tailored to application requirements, historical (e.g. seasonal) performance, system metrics and/or other factors to provide, among other benefits, cost-performance effective services.

According to various embodiments, "right-sizing" or "scaling" of multiple resources (e.g. storage, compute, memories, etc.) can be manual but preferably is automatic. The principles disclosed herein can be applied to environments that are system configuration aware and/or information aware or not system configuration aware and/or information aware.

According to additional embodiments, inline "right-sizing" or "scaling" can be performed by assessing performance and/or resource usage characteristics, preferably, but not necessarily, in real-time, to adjust provisioned performance levels and/or types accordingly. In a system that includes a storage device, for example, the system can be configured to detect an increase in input/output (TO) demand and to adjust the provisioned input/output operations per second (IOPS) of the storage device as needed. According to various embodiments, the systems, apparatuses and methods alternatively can be implemented in an "offline" environment. Where system performance and resource demands are captured and analyzed after each application run and provisioned performance levels and/or types can be adjusted before the start of the next run.

The systems and methods described and contemplated herein can include one or more of the following: (1) iterative search; (2) iterative search with system information, (3) predictive model with system information, and (4) predict model with system information and machine learning (ML), e.g., a model artifact created by a training process.

An exemplary implementation of a selected embodiment of the iterative search can comprise the following processes.

For each (or some) available service (e.g. compute, storage and etc.), a list of possible provision levels/types can be prepared and sorted by "performance/power" (e.g. a number of available cores, threads, memory, available TOPS, throughput, etc.). In an Amazon Elastic Compute Cloud (or AWS EC2) environment, for example, instance types can include m4.large, m4.xlarge, m4.2xlarge, etc. Additionally and/or alternatively, exemplary storage types can include a hard disk drive (or hdd), a solid state drive (or ssd), and/or a random access memory drive (or ramdisk) without limitation.

A list of high, mid and/or low water marks for the services can be prepared. In selected embodiments, the water marks can be at least partially user defined.

The search (or application) can be repeated for capturing an amount of resources (e.g. compute, memory, IO, network bandwidth) consumed (e.g. central processing unit (or CPU) utilizations over time, read/write TOPS, etc.). At end of each search, the provisioned levels/types can be incremented (or decremented) by one according to an amount of resources consumed as compared to the low, mid and high water marks. For example, the provisioned level/type can be incremented (or decremented) if the amount of resources consumed is greater than or equal to the high water mark. In selected embodiments, the power of the provisioned device can be incremented and/or decremented if the amount of resources consumed is greater than or equal to the high water mark. The provisioned level/type, additionally and/or alternatively, can be decremented if the amount of resources consumed is less than the high water mark (or, alternatively, is less than the low water mark). In selected embodiments, the naive "linear search" above can be replaced with a more sophisticated type of search, such as a "binary search."

The following provides various details of an exemplary implementation of an alternative embodiment of the iterative search.

For each available service, such as a compute service, a storage service, etc., without limitation, a list of possible provision levels/types can be prepared and sorted by "performance" (e.g. a number of available cores, threads, memory, available TOPS, throughput, etc.). Optionally, an index 0 can refer to the least performant level/type and an index "n" can refer to the most performant. In an Amazon Elastic Compute Cloud (or AWS EC2) environment, for example, instance types can include m4.large, m4.xlarge, m4.2xlarge, etc. Additionally and/or alternatively, exemplary storage types can include a hard disk drive (or hdd), a solid state drive (or ssd), and/or a random access memory drive (or ramdisk) without limitation.

A list of high, mid and low water marks can be prepared for the services. In selected embodiments, the water marks can be at least partially user defined. With regard to storage devices, for example, a low water mark can comprise 10% of available TOPS for the storage devices, a mid water mark can comprise 50% of the available TOPS and a high water mark can comprise 90% of the available TOPS. If a selected storage device is capable of 1000 TOPS, the low water mark can be 100 IOPS, the mid water mark can be 500 IOPS and the high water mark can be 900 IOPS in accordance with the preceding example. Stated somewhat differently, the water marks can be set as a "raw" number (e.g. 100 IOPS) and/or as a relative percentile number (e.g. 10% of the compute hardware (HW) maximum IOPS).

A "coordinate search" can be performed, wherein only one service provision level/type is adjusted at a time until convergence. Convergence can include a point in which no service provision levels/types are further adjusted.

The search can commence by provisioning every service to be the most performant level/type.

The following steps can be repeated until convergence is achieved:
  a. selecting a service, such as CPU type, to adjust. The service can be selected, for example, by round-robin through the available services;
  b. running the application and capturing an amount of resources consumed for the selected service (e.g. CPU utilization over time);
  c. calculating an average, a standard deviation (or stddev), a minimum (or min) and/or a maximum (or max) of the resource consumption;
  d. adjusting the service provision level/type according to amount of resources consumed as compared to the low, mid and/or high water marks. For example, the provisioned level/type can be incremented if the amount of resources consumed is greater than or equal to the high water mark. The provisioned level/type, additionally and/or alternatively, can be decremented if the amount of resources consumed is less than the high water mark (or, alternatively, is less than the low water mark); and/or
  e. optionally and/or alternatively calculating an exact number to which the provision level/type is to be changed. For example, average and/or stddev calculations set forth above can be used to set the provisioned TOPS to be average+2*sddev, which, if a normal distribution is used, can satisfy 97.7% of the application demand.

In selected embodiments, the naive "linear search" above can be replaced with a more sophisticated type of search, such as a "binary search." The search preferably starts with the most performant provision level/type for each service. Possible bottlenecks that can interfere with resource consumption measurements, such as a lack of available memory that might artificially lower CPU utilization measurements as the CPU waits for data to be paged in and/or out of memory, thereby can be reduced or even eliminated.

In an environment with only compute and storage services, for example, the CPU and storage services of the most performant level/type can be provisioned and the following can be repeated until convergence is achieved.

For example, in every even run, the number of compute service provisioned performance/type can be adjusted. In some embodiments, the exact formula/method set forth below could be adjusted, as desired. The provisioned CPU level/type, for example, can be adjusted in accordance with the following manner:
  a. if all CPU utilization data points are less than or equal to the low water mark or if the average CPU utilization is less than the mid water mark, the provisioned CPU level/type can be decremented by one;
  b. if all CPU utilization data points are greater than or equal to the high water mark or if the average CPU utilization is greater than or equal to the high water mark, the provisioned CPU level/type can be incremented by one; and
  c. if the average CPU utilization is between the high water mark and the mid water mark, no change is needed, and continue to next run.

On every odd run, the storage service provision type/level can be adjusted. In some embodiments, the exact formula/method set forth below could be adjusted, as desired. The TOPS, for example, can be adjusted in accordance with the following manner:
  a. set provisioned TOPS, throughput to the average IOPS or throughput used plus two standard deviations (or stddev); and
  b. clip and adjust the provisioned IOPS/throughput with respect to the low water mark and the high water mark.

Additionally and/or alternatively, a similar adjustment scheme can be employed for selecting a CPU level. If a choice of provision service level is expected (e.g. 100 IOPS, 200 IOPS and etc.), the provision service level can be utilized instead of the raw numbers. Stated somewhat differently, the increment/decrement method set forth above for even runs can be utilized if provisioning requires a discrete type and/or the average+2*stddev method set forth above for odd runs can be utilized if provisioning requires a "raw" number.

The following provides various details of an exemplary implementation of an iterative search with system information. In selected embodiments, the iterative search with system information can be performed in a manner similar to the iterative search described above. Instead of naively decrementing/incrementing the provisioned performance levels/types by one as set forth above, however, system information (e.g. a number of available cores, threads, memory, TOPS, throughput) can be referenced to make a more educated estimation on how much to adjust the provisioned performance levels/types. For example, if current average CPU utilization is 90% on a single core system, the provisioned CPU level can be incremented by four to a quad core system, expecting 25% CPU utilization. In other words, the utilization can be lowered to 25% (e.g. a low water mark) by incrementing the provisioned CPU level by four to a quad core system.

The following provides various details of an exemplary implementation of a predictive model with system information:

a. For each (or some) available service (e.g. compute, storage, etc.), preparing a list of possible provision levels/types sorted by "performance/power," such as a predetermined number of available cores, threads, memory, available TOPS, throughput, etc. In an Amazon Elastic Compute Cloud (or AWS EC2) environment, for example, instance types can include m4.large, m4.xlarge, m4.2xlarge, etc. Additionally and/or alternatively, exemplary storage types can include a hard disk drive (or hdd), a solid state drive (or ssd), and/or a random access memory drive (or ramdisk) without limitation.
  b. Running the application and capturing the amount of resources (e.g. compute, memory, IO, network bandwidth) consumed, such as CPU utilizations over time, read/write (R/W) TOPS, etc., using the most performant provision types.
  c. Calculating application resource requirements from system information and resource utilization rates from the preceding step of running the application and capturing the amount of resources consumed. In some embodiments, an exact system configuration/information might not be important. For example, it may be possible to use a synthetically defined "performance unit" to measure the power/effectiveness of available provision levels/types.
  d. Adjusting the provisioned performance level/type according to numbers derived from the preceding step of calculating application resource requirements for the most optimal price-performance efficient services according to user options. Different users, for example, may prefer different performance to price ratio and this may differ from job to job and from time of day.

The following provides various details of an alternative exemplary implementation of the predictive model with system information:

a. For each (or some) available service (e.g. compute, storage and etc.), preparing a list of possible provision levels/types sorted by "performance/power," such as a predetermined number of available cores, threads, memory, available TOPS, throughput, etc. In some embodiments, an index 0 can refer to the least performant level/type and index "n" can refer to the most performant. In an Amazon Elastic Compute Cloud (or AWS EC2) environment, for example, instance types can include m4.large, m4.xlarge, m4.2xlarge, etc. Additionally and/or alternatively, exemplary storage types can include a hard disk drive (or hdd), a solid state drive (or ssd), and/or a random access memory drive (or ramdisk) without limitation.
  b. Running the application and capturing the amount of resources (e.g. compute, memory, IO, network BW) consumed (e.g. CPU utilizations over time, R/W TOPS, etc.) using the most performant provision levels/types for each service.
  c. Calculating an average, a standard deviation (or std-dev), a minimum (or min) and/or a maximum (or max) of the each consumption.
  d. Calculating average, minimum and/or maximum application resource requirement/consumption from system information and resource utilization rates from the preceding step of running the application and capturing the amount of resources consumed.
  e. Adjusting the provisioned performance level/type according to numbers derived from the step of calculating the average, minimum and/or maximum application resource requirement/consumption to provide the most optimal price-performance efficient services according to user options. In some embodiments, different users may prefer different performance to price ratio. The user preferences may differ from job to job and/or based upon a time of day. For example, a frugal user may adjust provision level/type according to the minimum estimated requirements; while, a price conscious user may adjust according to the average estimated requirements. Additionally and/or alternatively, a performance user may provision according to the maximum estimated requirements.

In some embodiments, exact system configuration information might not be important because it can be possible to use a synthetically defined "performance unit" to measure the power/effectiveness of available provision levels/types. For example, an Abstract Compute Unit (or ACU) can be defined as an amount of compute that can be provided by a single core 1 gigahertz (Ghz) ARM Coretex-A8, a 32-bit processor core licensed by ARM Holdings.

Some examples are set forth in Table 1 below, where GB refers to gigabit, MB refers to megabit, and Mbs refers to megabit per second.

TABLE 1

| System Info And Resource Utilization Rates | Estimated Application Resource Requirement/Consumption |
| --- | --- |
| 1 GB memory @ average 25% utilization | ~average 256 MB memory requirement |
| 1 core 1 Ghz system @ average 100% utilization | ~average 1 ACU requirement |
| 2 core 2 Ghz system @ average 25% utilization | ~average 1 ACU requirement |
| 2 core 2 Ghz system @ average 25% utilization | ~average 2 core 1 Ghz system @ 50% utilization |
| 100 Mbs network interface @ average 10% utilization | ~average 10 Mbs network requirement |
| 2 GB memory @ 50% max utilization | ~max 1 GB memory requirement |
| 1 GB memory @ 10% min utilization | ~min 100 MB memory requirement |

The following provides various details of an exemplary implementation of a predictive model with machine learning (ML). In selected embodiments, the implementation of a predictive model with machine learning can be performed in a manner similar to the predictive model with system information described above. Instead of relying on understanding of the intricacies of system configuration (e.g. a number of cores and frequencies), machine learning can be utilized to create a model for use. With sufficient training examples, the system can provide a rough estimate of application resource requirements and predict system utilization levels, such as how much CPU that the application will consume when executing on a newly available provision type, on different hypothetical system configurations.

The following provides various details of an alternative exemplary implementation of a predictive model with machine learning (ML). In selected embodiments, the implementation of a predictive model with machine learning can be performed in a manner similar to the predictive model with system information described above. Instead of scripted/fixed calculation of estimated application resource requirement/consumption, the machine learning can be used to create a model of application resource consumption. With sufficient training examples, the machine learning system should be able to model minimum, maximum and/or average application resource consumption/requirement and even predict utilization levels on hypothetical system configurations. The machine learning system, for example, can be able to predict how much CPU that the application will consume on a newly available processor type.

In selected embodiments, the following features can be used in the machine learning model:
  System configuration information (e.g. a number of available cores, threads, memory);
  Temporal information (e.g. date and time of data record to capture seasonal fluctuations);
  Application characteristics (e.g. hash, size, code source analyses); and
  additional synthetic features can be formulated from "raw features" such as a number of cores*CPU frequency*threads per core*amount of memory, such as dynamic random access memory (DRAM), available.
  Minimum, maximum and/or average application resource consumption rate/level (e.g. CPU utilizations over time, read/write TOPS consumed) can be used as labels.

An exemplary flow chart for illustrating an embodiment of a method 100 for implementing a predictive model with system information is shown in FIG. 1. Turning to FIG. 1, the method 100 includes, for each available service, preparing a list of possible provision levels and/or provision types, at 110. The list of possible provision levels and/or provision types preferably is sorted by power, capacity and/or performance. The method 100 includes running an application and capturing an amount of resources consumed, at 120. The amount of resources consumed can be captured, for example, by using most performant provision levels and/or most performant provision types for each services. The most performant provision levels and/or most performant provision types can be identified based upon the list of possible provision levels and/or provision types prepared, at 110.

At 130, an average value, a standard deviation (or stddev) value, a minimum (or min) value and/or a maximum (or max) value of the captured amount of resources consumed at 120 can be calculated. An average value, a standard deviation (or stddev) value, a minimum (or min) value and/or a maximum (or max) value of at least one application resource requirement and/or at least one application resource consumption can be calculated, at 140. The value calculation, at 140, can be based at least upon a system configuration and/or resource utilization information. Stated somewhat differently, the value calculation, at 140, can be based at least in part on the captured amount of resources consumed at 120 and/or the value calculated at 130.

The method 100 can include, at 150, for each service, adjusting a provision level and/or a provision type according to the value calculation at 140. The adjustment to the provision level and/or the provision type advantageously can provide optimal price-performant services in accordance with one or more options provided by a user. The method 100 can end, at 160.

Figure 2:
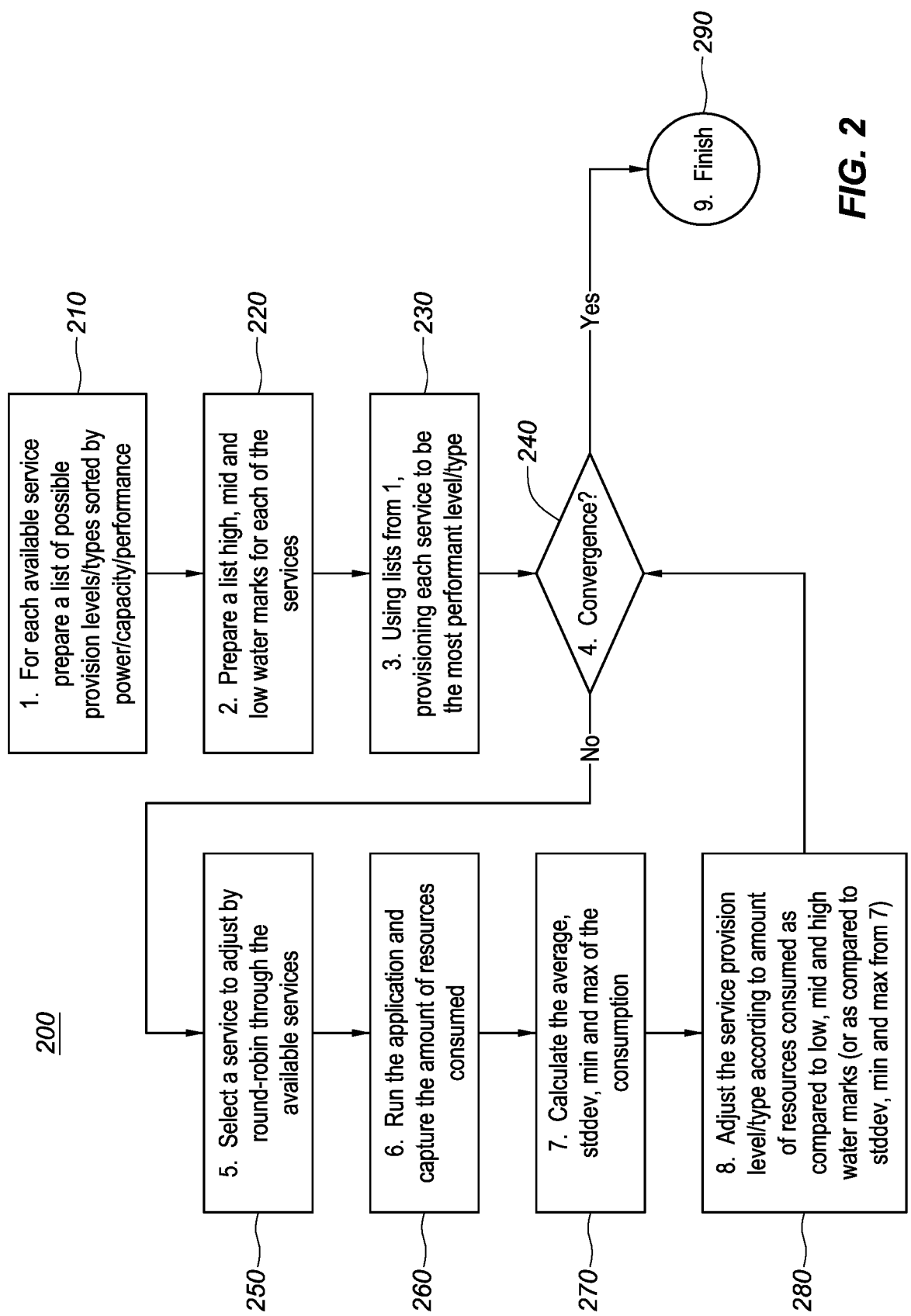
FIG. 2 is an exemplary flow chart for illustrating an embodiment of a method for performing an iterative search.

An exemplary flow chart for illustrating an embodiment of a method 200 for performing an iterative search is shown in FIG. 2. Turning to FIG. 2, the method 200 includes, for each available service, preparing a first list of possible provision levels and/or provision types, at 210. The first list of possible provision levels and/or provision types preferably is sorted based at least in part on power, capacity and/or performance. The method 200 includes preparing a second list of high, mid-level (or middle) and/or low water marks for each of the services, at 220.

At 230, each of the services is provisioned to be a most performant level and/or a most performant type. The method 200 optionally can determine whether the available services have converged, at 240. Stated somewhat differently, the method 200 directly proceed with selecting a service to adjust, at 250, after each of the services has been provisioned to be a most performant level and/or a most performant type, at 230. The method 200 alternatively can, at 240, can determine whether the available services as provisioned, at 230, have converged before proceeding with selecting a service to adjust, at 250, or ending, terminating or otherwise finishing, at 290.

If the convergence has not been achieved, the method 200 can selected a service to adjust, at 250. The service can be selected from among the available services in any predetermined manner, such as via a round-robin selection process. The method 200 includes running an application associated with the selected service and capturing an amount of resources consumed as the application is run, at 260. At 270, an average value, a standard deviation (or stddev) value, a minimum (or min) value and/or a maximum (or max) value of the captured amount of resources consumed optionally can be calculated.

The method 200 can compare the captured amount of resources consumed by the selected service with the high, mid-level and/or low water marks for the selected service as set forth in the second list. Additionally and/or alternatively, the optional average value, standard deviation value, minimum value and/or a maximum value of the captured amount of resources consumed by the selected service, as optionally calculated at 270, can be compared with the high, mid-level and/or low water marks for the selected service as set forth in the second list. Based upon the comparison, the method 200 can adjust, at 280, the provision level and/or provision type for the selected service.

The method 200 can determine whether the available services have converged, at 240. As set forth above, convergence be achieved when none of the provision levels and/or provision types of the services requires further adjustment to be most performant. If convergence has not been achieved, another service is selected for adjustment, at 250, and an application associated with the other selected service is run and an amount of resources consumed as the application is run is captured, at 260. At 270, an average value, a standard deviation value, a minimum value and/or a maximum value of the captured amount of resources consumed is calculated.

The captured amount of resources consumed by the other selected service (and/or the associated calculated values) can be compared with the high, mid-level and/or low water marks for the other selected service as set forth in the second list. Based upon the comparison, the method 200 can adjust, at 280, the provision level and/or provision type for the other selected service. The method 200 can again determine whether the available services have converged, at 240. Once convergence has been achieved, the method 200 can end, terminate or otherwise finish, at 290.

Figure 3A:
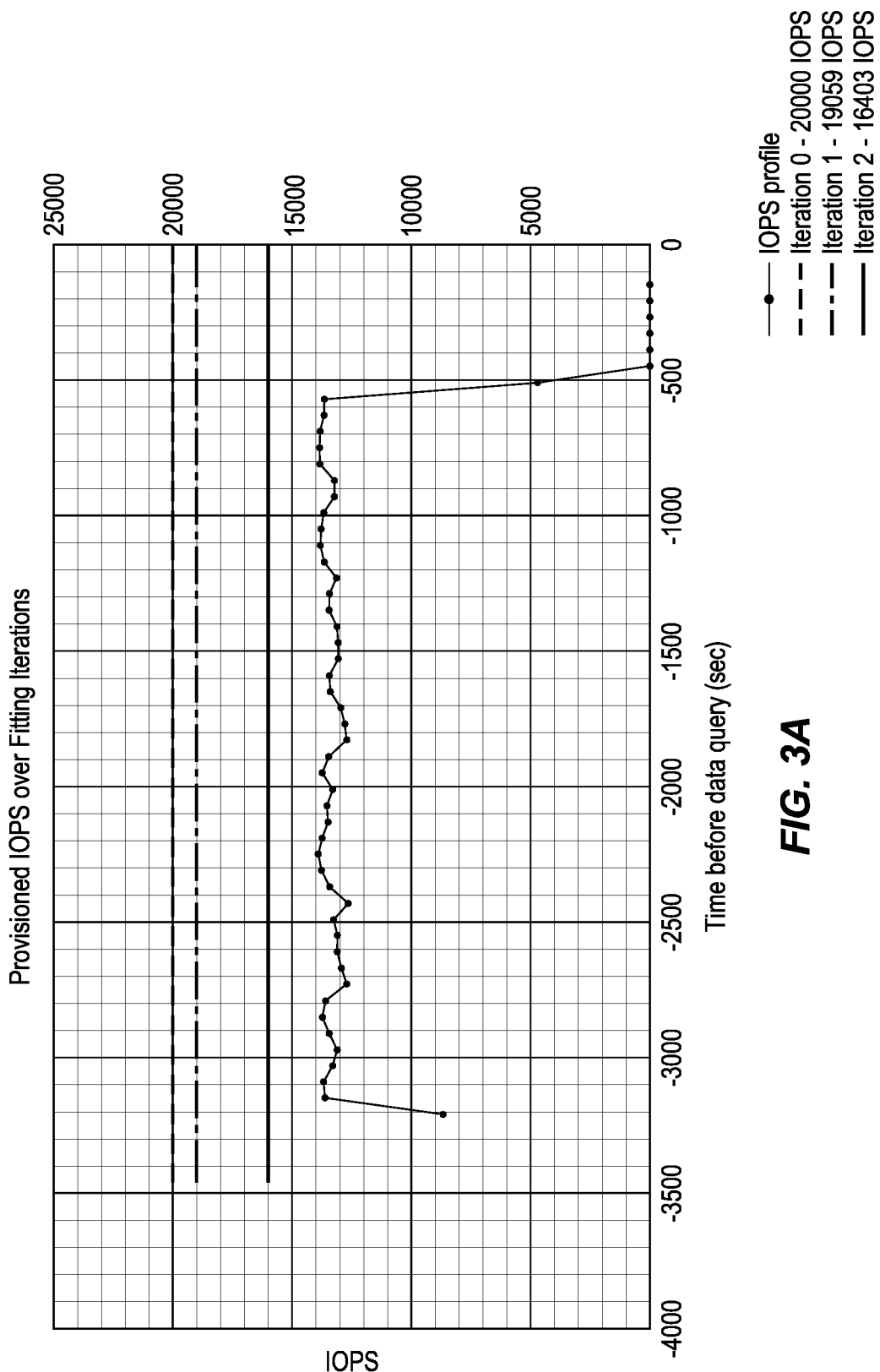
FIGS. 3A-B are exemplary charts for illustrating iterative search progress in accordance with the method of FIG. 2.
Figure 3B:
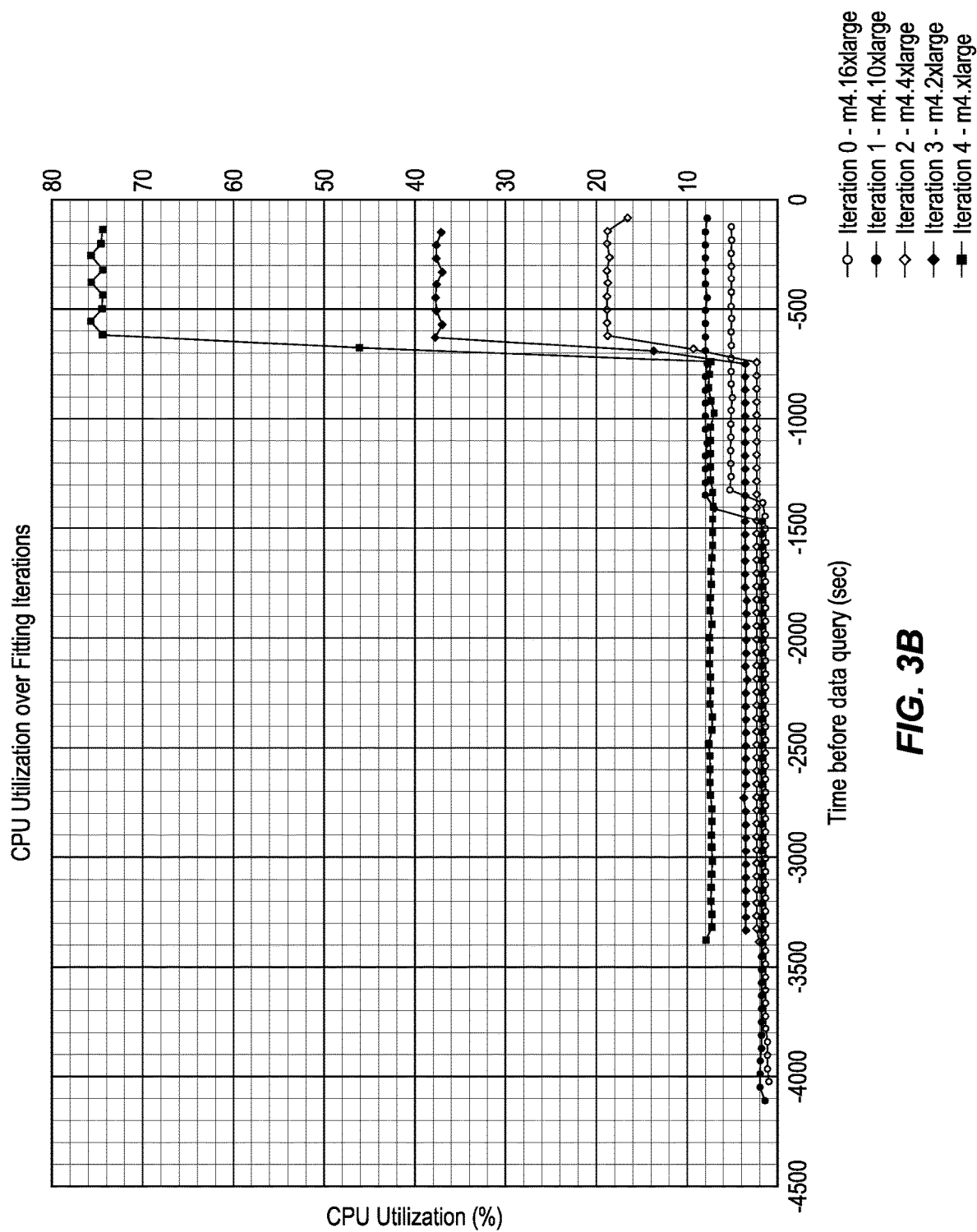
Figure 3C:
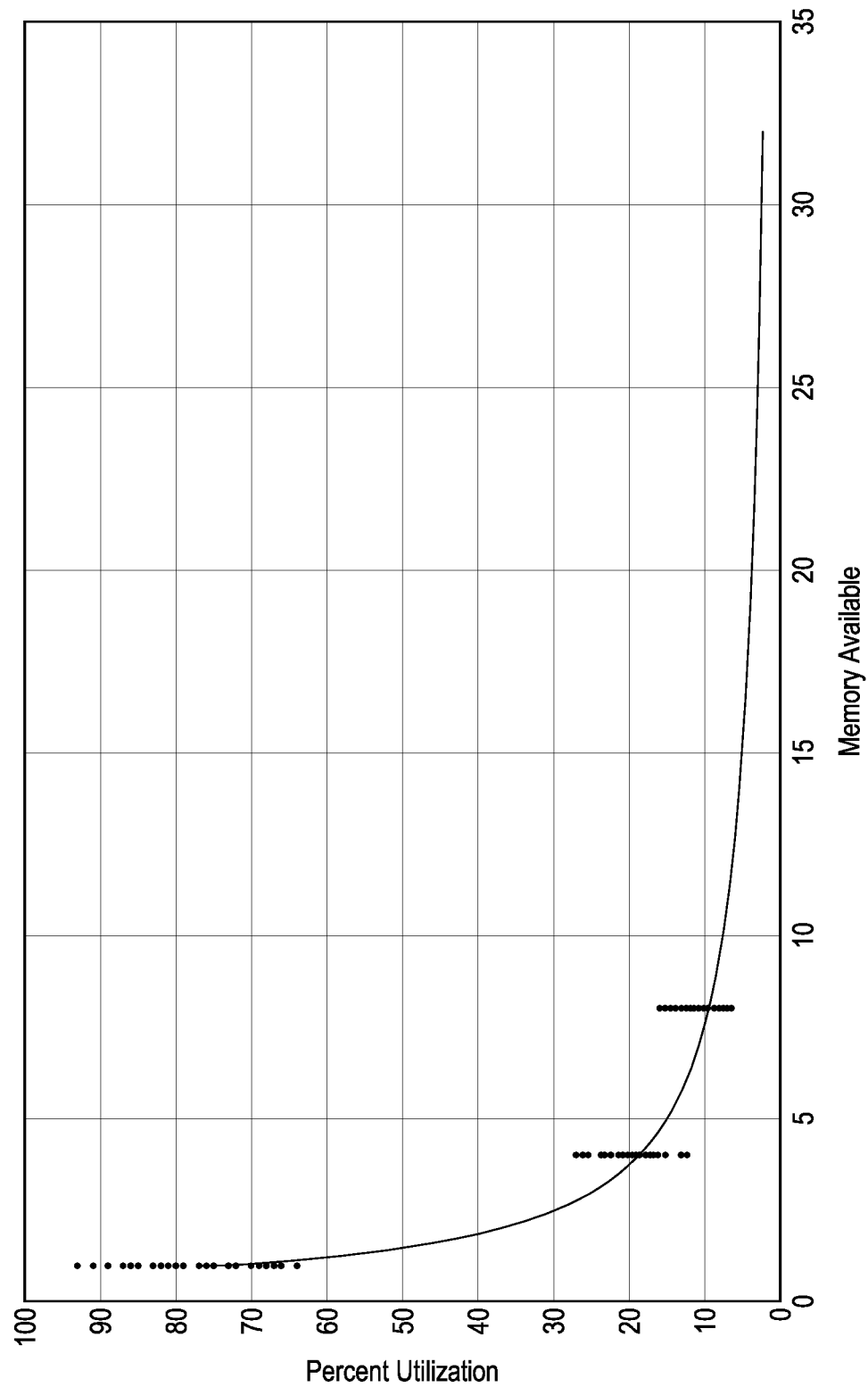
FIG. 3C is an exemplary chart for illustrating operation of the predictive model of FIG. 1 using system information and machine learning.

FIGS. 3A-C include exemplary charts for highlighting various principles and benefits according to various embodiments disclosed herein. The charts of FIGS. 3A-B show exemplary iterative search progress; whereas, the chart of FIG. 3C illustrates operation of the predictive model using system information and machine learning.

For example, with respect to CPU utilization, the charts show that, in the beginning (such as at iteration 0), the application only uses <5% of CPU which has a high cost to performance ratio; at iteration 4, there is a "right-sizing" to 75% CPU utilization which results in a significantly improved cost to performance ratio. Additionally, for example, with respect to TOPS, the charts show that in the beginning too much TOPS was allocated for the application, but after two runs (or iterations), it can be determined (e.g. learned) to decrement the allocated TOPS to the application thus improving the cost to performance ratio.

The principles described herein overcome limitations of prior solutions by, for example, according to various embodiments, making the "right-sizing" process automatic (e.g. scalable) and/or agnostic to service provider. For example, with machine learning, predictions can improve over time as additional examples can be observed. According to various embodiments, the machine learning model can be used to predict system utilization levels on different hypothetical system configurations.

Various benefits discussed herein (and other benefits) can be made possible using the disclosed principles. Although various implementations are discussed herein, the principles described herein are not limited to such. For example, while particular scenarios are referenced, it will be understood that the principles described herein apply to any suitable environment. Additionally, the various embodiments disclosed herein can be combined.

Accordingly, although particular embodiments have been described, the principles described herein can be applied to different types of environments and solutions. Certain embodiments have been described for the purpose of simplifying the description and for purposes of illustration only. Reference to particular hardware or software terms herein can refer to any other type of suitable device, component, software, and so on. Moreover, the principles discussed herein can be generalized to any number and configuration of devices and protocols, and can be implemented using any suitable type of digital electronic circuitry, or in computer software, firmware, or hardware. Accordingly, while this specification highlights particular implementation details, these should not be construed as limitations on the scope of any invention or of what may be claimed, but rather as descriptions of features that may be specific to particular embodiments.

What is claimed is:

1. A method comprising:
preparing a list, for each available service, of provision levels of computer resources provided by each available service;
sorting each list of provision levels based on at least one of a power, a capacity, and a performance of each computer resource, wherein at least one service of the each available service is a remotely provided service;
selecting, from a sorted list, a first computer resource provided by the remotely provided service from a group of available computer resources for adjustment, wherein the first computer resource includes at least one of storage, compute, memory, network bandwidth, and central processing unit (CPU) capacity;
optimizing, based on a user preference, a cost to performance ratio of running an application via the remotely provided service, wherein the optimizing of the cost to performance ratio comprises:
running, in real time, the application at least in part via the selected first computer resource;
capturing an amount of the first computer resource consumed during the running; and
adjusting a first provision for the selected first computer resource based on the amount of the first computer resource consumed and the user preference, wherein the first provision includes at least one of available input/output operations per second (IOPS), available compute cores, available threads, available memory, available throughput, available terra operations per second (TOPS), and type of memory storage; and
optimizing the cost to performance ratio of running the application based on a different user preference.

2. The method of claim 1 further comprising:
selecting a second computer resource from the group of available computer resources via a round-robin selection process;
running the application at least in part via the second computer resource;
capturing an amount of the second computer resource consumed during said running; and
adjusting a second provision for the second computer resource based on the amount of the second computer resource consumed, wherein the second provision includes at least one of available input/output operations per second (IOPS), available compute cores, available threads, available memory, available throughput, available terra operations per second (TOPS), and type of memory storage, and wherein the first provision is different than the second provision.

3. The method of claim 2 further comprising:
determining at least one of a low water mark, a mid-level water mark, and a high water mark of the first computer resource running the application while at its most performant level, a most performant type, or both; and
determining at least one of a low water mark, a mid-level water mark, and a high water mark of the second computer resource running the application while at its most performant level, a most performant type, or both.

4. The method of claim 3 further comprising:
comparing the amount of the first computer resource consumed to at least one of the low water mark, the mid-level water mark, and the high water mark of the first computer resource, wherein the adjusting of the first provision for the first computer resource is based on the comparison; and
comparing the amount of the second computer resource consumed to at least one of the low water mark, the mid-level water mark, and the high water mark of the second computer resource, wherein the adjusting of the second provision for the second computer resource is based on the comparison.

5. The method of claim 3, wherein adjusting the first provision includes one of increasing available IOPS and decreasing available IOPS, and wherein adjusting the second provision includes one of increasing available memory and decreasing available memory.

6. The method of claim 2 further comprising:
adjusting the different provision after the second provision has been adjusted; and
adjusting the adjusted second provision after adjusting the different provision.

7. The method of claim 4, wherein at least one of the low water mark, the mid-level water mark, and the high water mark of the first computer resource can be at least partially user defined.

8. The method of claim 1, wherein sorting each list includes sorting at least one list based, in part, on an abstract compute unit (ACU) to measure an effectiveness of compute power provision levels, wherein the ACU is based on at least a quantity of cores in a processor, a clock speed of the processor, and a utilization of the processor, and wherein the ACU is determined by a relationship where a one core, one gigahertz (Ghz) processor operating at one-hundred percent utilization is substantially equal to a two core, two Ghz processor operating at twenty-five percent utilization.

9. The method of claim 8, wherein said optimizing the cost to performance ratio further comprises comparing the captured amount of resources consumed during said running with a high water mark for the selected first computer resource, a mid-level water mark for the selected first computer resource, a low water mark for the first selected computer resource or a combination thereof.

10. The method of claim 9, further comprising generating a list of high water marks, mid-level water marks, a low water marks or a combination thereof for each of the available computer resources.

11. The method of claim 9, comprising generating one or more statistics for the captured amount of resources consumed during said running, wherein said comparing comprises comparing the captured amount of resources consumed during said running with the generated one or more statistics.

12. The method of claim 11, wherein said generating the one or more statistics includes generating an average value for the captured amount of resources consumed during said running, a standard deviation value for the captured amount of resources consumed during said running, a minimum value for the captured amount of resources consumed during said running, a maximum value for the captured amount of resources consumed during said running or a combination thereof.

13. The method of claim 1, wherein said adjusting the first provision includes adjusting a provision level for the selected first computer resource, a provision type for the selected first computer resource or both in accordance with one or more options provided by a user.

14. The method of claim 1, further comprising determining whether the available computer resources have converged.

15. The method of claim 14, wherein said determining occurs after said adjusting.

16. The method of claim 14, wherein said determining comprises determining whether provision levels of the available computer resources, provision types of the available computer resources or both require further adjustment to be most performant.

17. The method of claim 14, further comprising:
determining that the available computer resources have not converged;
selecting a second computer resource from the group of available computer resources for adjustment;
running an application associated with the selected second computer resource;
capturing an amount of resources consumed during said running the application associated with the selected second computer resource; and
adjusting a provision level for the selected second computer resource, a provision type for the selected second computer resource or both.

18. The method of claim 17, further comprising determining whether the available computer resources have converged after said adjusting the provision level for the selected second computer resource, the provision type for the selected second computer resource, or both.

19. A computer program product being encoded on one or more non-transitory machine-readable storage media and comprising:
instruction for preparing a list, for each available service, of provision levels of computer resources provided by each available service, wherein each available service is provided remotely;
instruction for sorting each list of provision levels based on at least one of a power, a capacity, and a performance of each computer resource in the list for each available service, wherein sorting at least one list is also at least partially based on an Abstract Compute Unit (ACU) to measure an effectiveness of compute power provision levels;
instruction for selecting a first computer resource from a group of available computer resources for adjustment, wherein the first computer resource includes at least one of storage, compute, memory, network bandwidth, and central processing unit (CPU) capacity;
instruction for optimizing, based on a user preference, a cost to performance ratio of running an application via one available service, wherein the optimizing of the cost to performance ratio comprises:
instruction for running the application at least in part via with the selected first computer resource;
instruction for capturing, while the application is running, a first amount of resources consumed by the application during the running;
instruction for adjusting a first provision for the selected first computer resource to a different provision based on the first amount of resources consumed and the user preference to optimize the cost to performance ratio, wherein the first provision includes at least one of available input/output operations per second (IOPS), available compute cores, available threads, available memory, available throughput, available terra operations per second (TOPS), and type of memory storage;
instruction for running the application via the selected first computer resource provisioned to the different provision; and
optimizing the cost to performance ratio of running the application based on a different user preference.

20. A system comprising a processor configured to carry out:
preparing a list, for each available service, of provision levels of computer resources provided by each available service
sorting each list of provision levels for computer resources based on at least one of a power, a capacity, and a performance of each computer resource in the list for each available service, wherein sorting at least one list is also at least partially based on an Abstract Compute Unit (ACU) to measure an effectiveness of compute power provision levels, and wherein at least one service of the each available service is provided by a remote service provider;
selecting a first computer resource provided by the remote service provider from a group of available computer resources for adjustment, wherein the first computer resource includes at least one of storage, compute, memory, network bandwidth, and central processing unit (CPU) capacity;

optimizing, based on a user preference, a cost to performance ratio of running an application via the remote service provider, wherein the optimizing of the cost to performance ratio comprises:
  running the application at least in part via the selected first computer resource;
  capturing, while the application is running, an amount of the selected first computer resource consumed by the application during the running;
  adjusting a first provision for the selected first computer resource to a different provision based on the amount of the first computer resource consumed and the user preference, wherein the first provision includes at least one of available input/output operations per second (IOPS), available compute cores, available threads, available memory, available throughput, available terra operations per second (TOPS), and type of memory storage; and
  running the application via the first computer resource provisioned to the different provision to optimize the cost to performance ratio based on the user preference; and optimizing the cost to performance ratio of running the application based on a different user preference.

\* \* \* \* \*